US011268556B2

(12) United States Patent
Giovannetti

(10) Patent No.: US 11,268,556 B2
(45) Date of Patent: Mar. 8, 2022

(54) DEVICE FOR JOINING OF PARTS OF FURNITURE AND FURNISHING ACCESSORIES

(71) Applicant: Häfele Berlin GmbH & Co KG, Berlin (DE)

(72) Inventor: Antonio Giovannetti, Segrate (IT)

(73) Assignee: HÄFELE BERLIN GMBH & CO KG, Berlin (DE)

(*) Notice: Subject to any disclaimer, the term of this patent is extended or adjusted under 35 U.S.C. 154(b) by 689 days.

(21) Appl. No.: 16/214,047

(22) Filed: Dec. 8, 2018

(65) Prior Publication Data
US 2019/0107132 A1 Apr. 11, 2019

Related U.S. Application Data

(63) Continuation of application No. PCT/EP2017/065066, filed on Jun. 20, 2017.

(30) Foreign Application Priority Data

Jul. 20, 2016 (IT) .................... IT102016000076302

(51) Int. Cl.
F16B 12/20 (2006.01)
A47B 88/90 (2017.01)
(Continued)

(52) U.S. Cl.
CPC ...... F16B 12/2027 (2013.01); A47B 47/0075 (2013.01); A47B 88/941 (2017.01);
(Continued)

(58) Field of Classification Search
CPC .... F16B 12/2027; F16B 12/24; A47B 96/066; A47B 2230/0033; A47B 2230/0048
(Continued)

(56) References Cited

U.S. PATENT DOCUMENTS 4,693,630 A * 9/1987 Giovannetti ............ F16B 7/046
403/231
6,148,569 A * 11/2000 Giovannetti ............ F16B 7/046
403/231
(Continued)

FOREIGN PATENT DOCUMENTS

DE 10 2009 043 179 A1 9/2011
EP 3502491 A1 * 6/2019 ............ F16B 13/065
(Continued)

Primary Examiner — Daniel J Troy
Assistant Examiner — Timothy M Ayres
(74) Attorney, Agent, or Firm — Hackler Daghighian Martino & Novak

(57) ABSTRACT

A joining device for parts of furniture and furnishing accessories includes a casing or container body suitable for being inserted in a seat formed in one of the components of the item of furniture to be joined and provided with an expansion bushing externally projecting with respect to a first end or front end of said casing or container body and suitable for engaging with a further seat of a further component of the item of furniture to be joined to the component wherein the casing or container body is inserted. Said joining device includes a cam mechanism for a linear motion of actuation means co-operating in an expansion and retraction deformation movement of the expansion bushing and simultaneous expansion of at least one portion of said casing or container body, with said cam mechanism and actuation means housed in the casing or container body and actuated by a tool.

8 Claims, 4 Drawing Sheets

(51) Int. Cl.
  *A47B 47/00* (2006.01)
  *A47C 4/02* (2006.01)
  *A47C 19/00* (2006.01)
  *F16B 12/24* (2006.01)
  *A47B 96/06* (2006.01)
  *A47B 63/00* (2006.01)

(52) U.S. Cl.
  CPC .............. *A47C 4/02* (2013.01); *A47C 19/005* (2013.01); *F16B 12/24* (2013.01); *A47B 63/00* (2013.01); *A47B 96/066* (2013.01); *A47B 2088/902* (2017.01); *A47B 2230/0033* (2013.01); *A47B 2230/0048* (2013.01)

(58) Field of Classification Search
  USPC ........................................................ 403/297
  See application file for complete search history.

(56) References Cited

U.S. PATENT DOCUMENTS

| | | | |
|---|---|---|---|
| 6,908,252 B1* | 6/2005 | Rubano ............... | F16B 12/2027 |
| | | | 403/231 |
| 11,098,740 B2* | 8/2021 | Giovannetti ............. | A47C 4/02 |

FOREIGN PATENT DOCUMENTS

| | | | | |
|---|---|---|---|---|
| RU | 2010 138 067 A | 3/2012 | | |
| SE | 1 300 329 A1 | 11/2014 | | |
| WO | WO-2016055218 A1 * | 4/2016 | .............. | F16B 12/22 |
| WO | WO-2018167554 A1 * | 9/2018 | .......... | F16B 12/036 |

\* cited by examiner

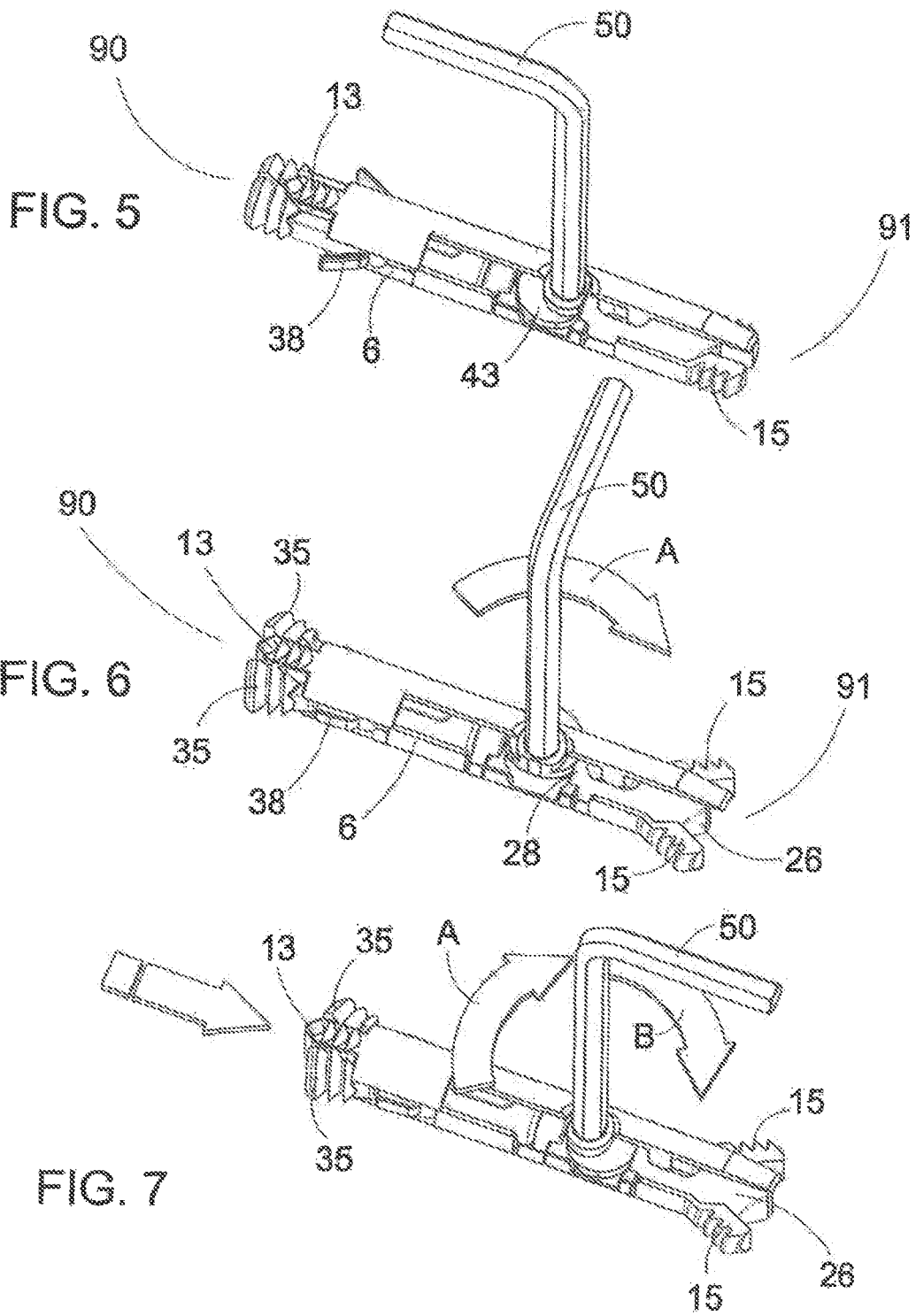

DEVICE FOR JOINING OF PARTS OF FURNITURE AND FURNISHING ACCESSORIES

CROSS-REFERENCE TO RELATED APPLICATIONS

This continuation application claims priority to PCT/EP2017/065066 filed on Jun. 20, 2017 which has published as WO 2018/015090 A1 and also the Italian application number 102016000076302 filed on Jul. 20, 2016, the entire contents of which are fully incorporated herein with these references.

DESCRIPTION

Field of the Invention

The present invention relates to an improved device for joining parts of furniture and furnishing accessories.

More particularly the present invention relates to a device suitable for assembling furniture and/or furnishing accessories of the shelf unit, bookcase, drawer unit, bed frame, seating type and the like.

Background of the Invention

As is known, furniture and furnishing accessories are made increasingly frequently by stably and removably joining single parts which will go to define the overall assembly represented, for example, by a bookcase or by a shelf unit, by a chair or by any other item of furniture not made in a single piece but defined by an assembly of single parts.

Such a kit structure entails considerable advantages linked, for example, to a facility of transport of structures, even bulky ones, to the possibility of mounting of the furniture directly on site or, likewise, to the possibility of transport and assembly also by non-expert users.

The retaining elements used to join one to the other the different components or single parts of the furniture are defined, for example, by tie rods or bushings, cams and similar means.

Referring by way of an example to an item of furniture of the bookcase type or to a shelf unit, it comprises typically two vertical uprights tendentially parallel one to the other between which are interposed, along a plane perpendicular to the plane of longitudinal development of the uprights, one or more shelves having the function of defining a plane of resting and support for books, magazines, vases and/or other multiple and different objects.

The assembly of the structure of the frame and of the shelves with respect to said frame can be performed using retaining means represented by bushings or cams inserted in the thickness of the shelves (or of the uprights) and co-operating in clamping with corresponding pins or screws inserted in the uprights (or in the shelves) and which, actuated by means of an appropriate tool (screwdriver or Allen key or the like) cause the rotation of the bushing or of the cam so as to form the restraining of said pin or screw with respect to said bushing or cam.

However these clamping or restraint means entail some major disadvantages linked to the need to form grooves for housing components in co-operation (bushing and screw or pin) in the thickness of the parts in reciprocal coupling (both in the shelves and in the uprights).

Moreover said clamping means entail longer times of assembly since the operative has to insert the bushing or the cam and the screw or pin in the respective seats and, subsequently, act on the screw or pin to perform the clamping.

In order to solve these disadvantages other ways of removable joining have been developed which provide for the use of expansion joints apt to be inserted in the thickness of the uprights or of the shelves, with said joints which comprise an expansion bushing typically made in plastic material and a screw inserted coaxially to said bushing and, likewise, an eccentric bushing inserted in a groove formed in the thickness of one of the parts to be joined and apt to couple with the screw or pin of the expansion joint. The reciprocal clamping between the two components of the furniture takes place by acting with a tool which acts on the eccentric bushing which, rotating, imposes a backward movement of the pin with respect to the bushing wherein the pin is inserted with a consequent radial expansion of the same bushing.

However these traditional expansion joints also entail some major disadvantages linked to the fact that they comprise elements to be inserted in both the parts to be assembled with the consequent need to form suitable grooves and seats in said parts of the furniture.

A further disadvantage is linked to longer assembly times, in that the user has to insert the elements of the expansion joint in the seats of the parts to be joined and, subsequently, has to act on the eccentric bushing to impose the movement of the pin and the consequent expansion of the bushing in its seat.

A further disadvantage is represented by the fact that a possible loosening of the eccentric bushing entails a consequent movement of the pin and a return into a non-expanded position of the bushing of the pin and this may cause an inevitable loosening of the clamping restraint between the parts of the furniture.

SUMMARY OF THE INVENTION

The object of the present invention is that of obviating the disadvantages stated above.

More particularly an object of the invention is that of providing a joining device for parts of furniture and furnishing accessories which allows a simultaneous attachment to the two parts of the item of furniture to be joined.

A further object of the present invention is that of providing a joining device for parts of furniture and furnishing accessories which, when assembled, is single-part and comprises a reduced number of components, such as to be highly economical.

A further object of the present invention is that of providing a joining device which allows the reduction in the number of machining processes to be performed on the parts to be reciprocally assembled.

A further object of the present invention is that of providing a joining device which guarantees optimal clamping between the assembled parts and does not involve possible risks of loosening of this clamping.

A further object of the present invention is that of providing a joining device which allows a reduction in the times of assembly together with an easy, convenient and rapid assembly and disassembly of the component parts of the item of furniture (for example the mounting of shelves in a bookcase).

A further object of the present invention is that of making available to users a joining device for parts of furniture or furnishing accessories suitable for guaranteeing a high level of resistance and reliability in time and such, moreover, as to be able to be easily and economically manufactured.

These and other objects are achieved by the device according to the invention that has the features of claim 1.

Substantially, the joining device for parts of furniture and furnishing accessories, of the shelf unit, bookcase, drawer unit, bed frame, seating type and the like, according to the invention, comprises a casing or container body suitable for being inserted in a seat formed in one of the components of the item of furniture to be joined and provided with an expansion bushing externally projecting with respect to a first end or front open end of said casing or container body and suitable for engaging with a further seat of a further component of the item of furniture to be joined to the component wherein the casing or container body is inserted, wherein said joining device comprises a cam mechanism for a linear motion of actuation means co-operating in a movement of deformation in expansion and retraction of the expansion bushing and simultaneous expansion of at least one portion of said casing or container body, with said cam mechanism and actuation means housed in the casing or container body and actuated by a tool.

Advantageous embodiments of the invention are apparent from the dependent claims.

BRIEF DESCRIPTION OF THE DRAWINGS

The constructional and functional features of the joining device for parts of furniture or furnishing accessories of the present invention will be made clearer by the following detailed description, in which reference is made to the accompanying drawings which illustrate an embodiment thereof given solely by way of a non-limiting example and in which:

FIGS. 5, 6 and 7 are axonometric views, partially sectioned, of the device of FIG. 2 shown in successive phases of actuation and comprising the actuation tool;

DETAILED DESCRIPTION OF THE PREFERRED EMBODIMENTS

Figure 1:
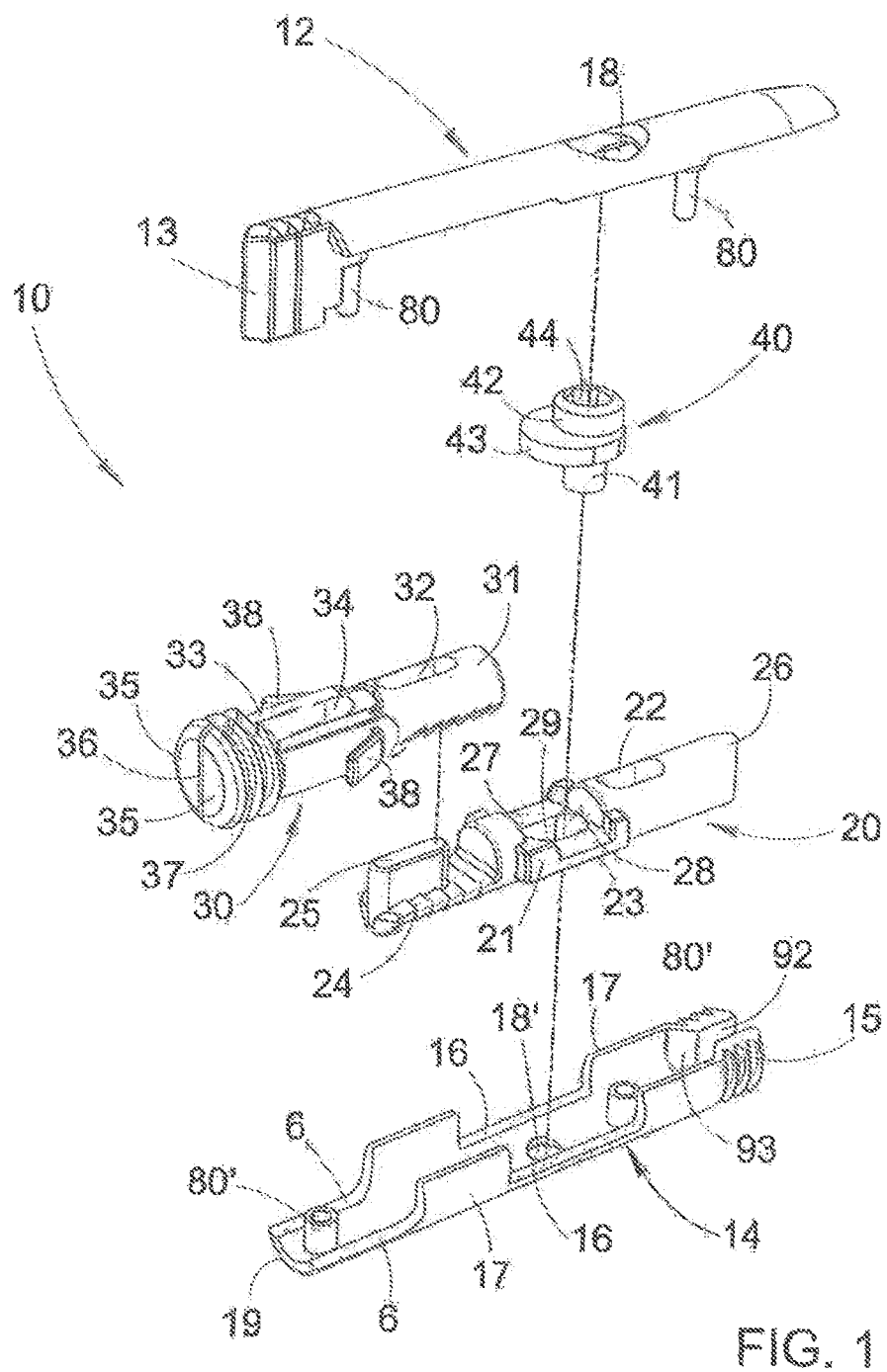
FIG. 1 shows schematically a blown-up axonometric view of the device for joining parts of furniture or furnishing accessories of the present invention.
Figure 2:
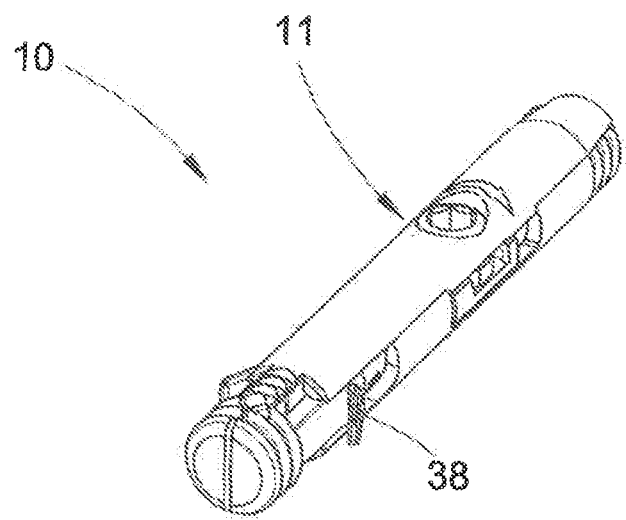
FIG. 2 shows schematically an axonometric view of the device of the invention assembled.
Figure 3:
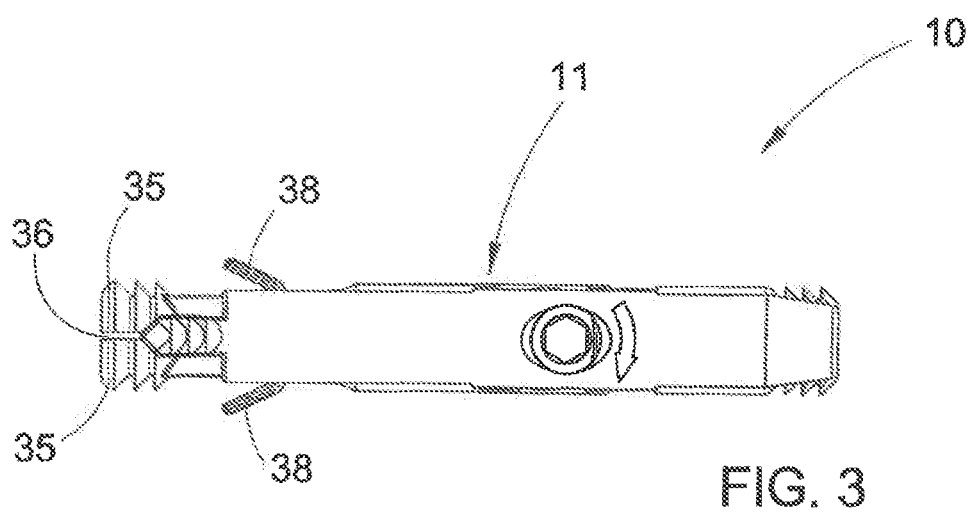
FIG. 3 is a plan view from above of the device of FIG. 2.
Figure 4:
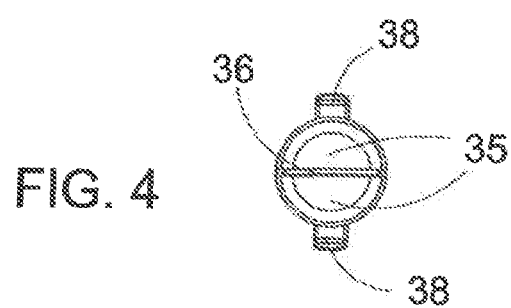
FIG. 4 is a view from the left-hand side of FIG. 3.

Referring to the aforesaid drawings, the joining device for parts of furniture or furnishing accessories of the present invention, denoted overall by 10 in the aforesaid drawings, comprises a casing or container body 11 with a substantially cylindrical shape, defined by an upper element 12 and by a lower element 14, which here below for the sake of convenience shall also be referred to as half-shells, although their shape is substantially different, as will be seen here below. The half-shells 12 and 14 are made preferably in plastic material or in another suitable material and have a different hardness. More particularly, the lower half-shell 14 is in a plastic which has a certain flexibility, while the upper half-shell 12 is in hard plastic, for the purposes to be mentioned.

The two half-shells are joined one to the other by means of a connection of the snap-fit type obtained by providing a pair of pegs 80 in the upper half-shell 12 which snap-couple with a corresponding pair of tubular elements 80' provided in the lower half-shell 14. Naturally other systems of attachment between the two half-shells can be provided, for example a screw or grub screw, by gluing or with another known and suitable method of connection.

Following the coupling between the aforementioned half-shells 12 and 14, the container body 11 has at a first end or front end 90 a wedge 13 which projects below from the upper half-shell 12 and is arranged beyond the front profile 19 of the lower half-shell 14, while at a second end or rear end 91 it has a vertical slit 92 formed in the lower half-shell 14, bordered by opposite externally serrated portions 15, determining a zone of expansion. Inside the lower half-shell 14 opposite slanting walls 93 are provided, for connection or entrance to said slit 92 for the objects to be mentioned here below.

The upper half-shell 12 and the lower half-shell 14 have, respectively, a through opening or hole 18 and 18', in the embodiment shown in different sizes, whose function will be made clearer here below.

In order to complete the description of the container body 11, as can be seen from the drawings, the lower half-shell 14 has large windows 16 on its opposite side walls with cylindrical shape 17, at said hole 18'. Moreover said side walls 17 do not reach the front end 19 of the lower half-shell 14, determining in this zone side openings 6 of the container body 11, once the upper half-shell 12, which acts as cover, has been assembled on the lower half-shell 14.

Inside the casing or container body 11 are housed the other components apt to perform the clamping between the parts of the furniture as described here below and comprising:

a slider 20;
an expansion bushing 30; and
a cam mechanism 40.

The slider 20 has a cylindrical stem shape, such as to be housed internally and coaxially to the lower half-shell 14 of the casing or container body 11. It has a first slot 21 placed approximately centrally and coaxially to the aforementioned holes 18, 18' of the half-shells 12, 14, and a second slot 22, apt to accommodate one of said peg 80/tubular element 80' connection pairs placed in the rear part of the container body (11). Both slots 21 and 22 have a longitudinal or axial development, so as to allow a sliding of the slider 20 inside the container body 11, as will be explained in greater detail here below.

Laterally to the first slot or central slot 21 respective opposite protuberances 23 are provided, apt to position in the aforementioned windows 16 of the side walls 17 of the lower half-shell 14. The length of the protuberances 23 is smaller than the width of the windows 16, so as to allow an axial sliding guided by the slider 20 of the container body 11.

The slider 20 has a flattened front end (that is, on the side turned towards the front end 90 of the container body 11) 24, wherefrom a ridge 25 projects upwards. The rear opposite end 26 of the slider 20 is instead wedge-shaped.

The expansion bushing 30 has a cylindrical shank 31, flattened below, having a longitudinal or axial slot 32, apt to receive the aforesaid protuberance 25 of the slider 20, such that, in mounted condition, the slider 20 and the expansion bushing 30 remain integral one with the other, as if they were a single part.

A pair of opposite side wings 33 project at the front from the shank 31, between which an empty space 34 is formed, longitudinally extending and apt to house the other peg 80/tubular element 80' connection pair placed in proximity of the front part of the container body 11.

Said opposite wings 33 end frontally with respective thickened portions 35, separated by a slit 36 and provided externally with teeth 37, developing in radial direction.

At the base of connection of the wings 33 to the cylindrical shank 31 respective flexible tabs 38 are provided, slightly diverging towards the front end of the device.

As mentioned, the slider 20 and the expansion bushing 30, in mounted condition of use, are integral one with the other and could therefore be made in a single part.

However, in order to simplify production and due to the different tasks performed by the two components, it is advantageous to make them in separate parts. More particularly, the slider 20, which has to have a certain rigidity, is made in metal material, such as for example zamak, or in hard plastic, while the expansion bushing 30 is made advantageously in soft or elastic plastic.

The cam mechanism 40 has a lower cylindrical section 41, an upper cylindrical section 42 of greater diameter and smaller height, and a central section 43 projecting radially, determining a cam profile.

The lower section 41 is apt to traverse the central slot 21 of the slider 20 and to be inserted in the hole 18' provided on the base wall of the lower half-shell 14, while the upper cylindrical section 42 goes to house in the hole 18 of greater diameter provided in the upper half-shell or cover 12. The central section with cam profile 43 is arranged instead in a hollowed seat 27 of the slider 20, on a level with said opposite lateral protuberances 23, limited longitudinally by opposite shoulders 28, 29 against which the cam profile 43 acts.

In the upper cylindrical section 44 a shaped seat 44 is provided, apt to hold a tool 50 (not shown in FIG. 1) for the actuation of the cam mechanism as will be described here below.

The shaped seat 44 could optionally be replaced by a through shaped hole to allow the actuation of the cam both from above and from below.

In this respect it is noted that the terms lower and upper used in this description are referred to the arrangement shown in the drawings, it being possible to mount the joining device overturned in the parts of furniture to be joined with respect to what is illustrated, to allow an actuation of the cam from below, and therefore in a less visible position.

The assembly of the components of the device is fairly simple and intuitive.

Once the slider 20, the expansion bushing 30 and the cam mechanism 40 are housed in the lower half-shell 14, as mentioned previously, with the slider 20 and the expansion bushing 30 integral one with the other, for the engagement of the protuberance 25 of the slider in the slot 32 of the bushing, the assembly is locked by applying the upper half-shell 12 on the lower half-shell 14, with the wedge protuberance 13 which goes to insert in the seat or free space 34 between the opposite wings 33 of the expansion bushing 30.

The functioning of the joining device according to the invention is now illustrated, referring in particular to FIGS. 5 to 7.

FIG. 5 shows the rest configuration of the device with the tool 50 inserted in the seat 44 of the cam mechanism 40.

In this configuration the slider 20, and with it the expansion bushing 30, are in the more advanced position on the side of the front end 90 of the container body 11, and held in this position by the cam profile 43 which acts with its more projecting part against the shoulder 29 of the slider 20.

FIG. 6 shows an intermediate configuration of first actuation displacement of the device of the invention.

More particularly, as indicated by the arrow A, by means of the tool 50 a rotation is imposed, preferably, through 90°, on the cam mechanism 40, as a consequence whereof the cam profile 43 goes to act against the shoulder 28, opposite to the shoulder 29, causing a backward movement of the slider 20 and of the expansion bushing 30.

During this movement the wedge-shaped rear part 26 of the slider 20 slides against the slanted walls 93 of entrance to the slit 92, causing a widening of the same and therefore the expansion of the externally serrated portions 15 of the lower half-shell 14, which determine the locking of the device in one of the two furniture parts to be joined.

At the same time the backward movement of the slider 20 means that the wedge protuberance 13 of the upper half-shell 12 penetrates the crack 36 between the thickened end parts 35 of the wings 33, causing the expansion thereof, and therefore the locking of the upper part of the item of furniture to be joined, also exerting a certain traction on the same.

FIG. 7 shows a final configuration of a second movement of the joining device of the invention.

As indicated by the arrow B, by means of the tool 50 a further rotation is imposed, preferably again through 90°, of the cam mechanism 40, with which a further backward sliding of the slider 20 is produced, producing a further backward movement of the expansion bushing 30, and optionally a further expansion both of the bushing 30 and of the externally serrated parts 15, thus causing a stable clamping of the parts of the item of furniture to be joined.

Figure 9:
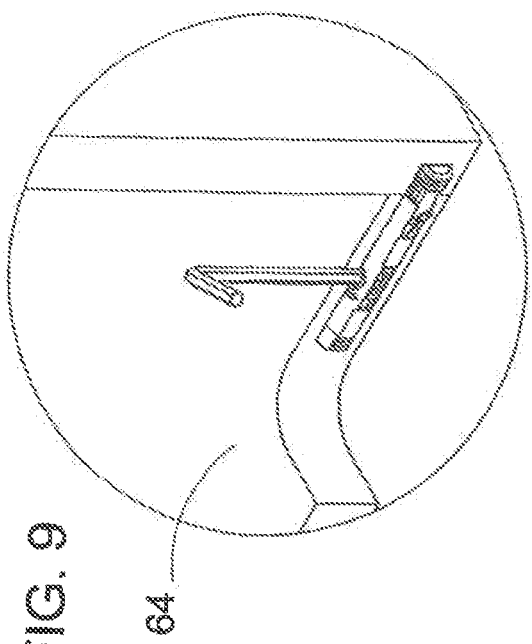
FIGS. 9 and 10 illustrate schematically two enlarged details of the joining device of the invention, said enlarged details representing two phases of clamping between the parts of the item of furniture of FIG. 8 after the coupling of said parts.
Figure 10:
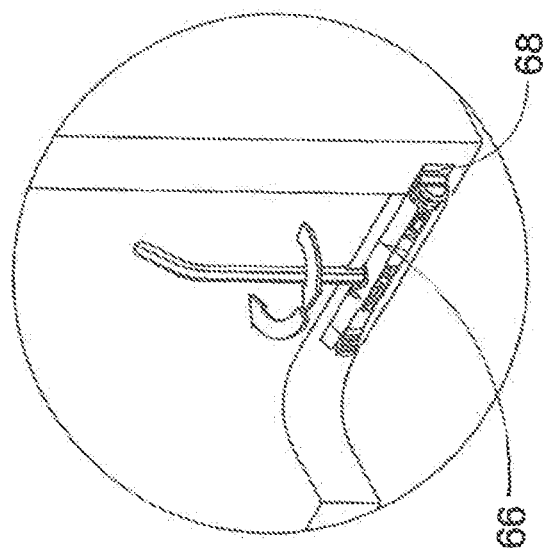
Figure 8:
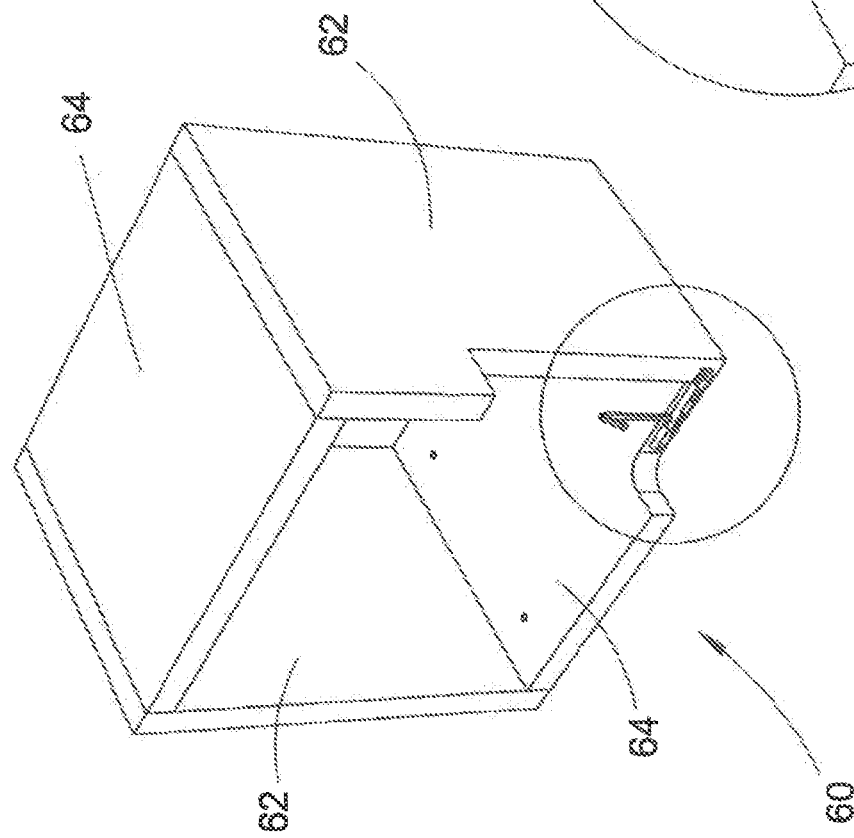
FIG. 8 shows schematically an axonometric view of an item of furniture assembled using joining devices of the invention, with said item of furniture partially sectioned to illustrate the arrangement of one of said joining devices.

FIGS. 8 to 10 illustrate an example of an item of furniture assembled using the joining devices 10 according to the invention.

FIG. 8 shows an axonometric view of an item of furniture 60 comprising two opposite and parallel shoulders 62 and two shelves 64 interposed between said opposite shoulders, perpendicular to them and parallel one to the other.

In the thickness of the shelves 64 grooves or pockets 66 are formed, having the function of housing the joining devices 10 of the invention, inserted in said grooves or pockets with the front portion of the bushing 30 which projects externally from said pocket and is apt to be inserted in a further pocket 68 formed in the thickness of the shoulders 62.

For correct insertion of the device 10 in a corresponding pocket 66 of the shelf 64, frontally to the shelf a milling can be formed for the passage of said flexible tabs 38 of the expandable bushing 30. The tabs 38 act therefore as orientation for the device 10.

Should frontally to the shelf 64 the abovementioned milling not be formed, during the insertion of the device 10 in the corresponding pocket 66 the flexible tabs 38 in any case would bend towards the interior on the corresponding wings 33, remaining within the maximum perimeter footprint of the device, and therefore not constituting any obstacle to the insertion of the device of the pocket 66.

As can be seen in FIG. 8, in the shelves 64 holes 70 are likewise provided, formed perpendicularly to the axis of the grooves or pockets 66 having the function of allowing the insertion of the tool 50 which couples with the shaped seat 44 of the cam mechanism 20 to perform the clamping action.

FIGS. 9 and 10 show two enlarged details of a portion of an item of furniture 60 assembled using the joining device of the invention and wherein the device 10, inserted in a groove or pocket 66 of a shelf 64, is shown in the rest configuration with the front portion of the expansion bushing 30 inserted in the pocket 68 of the shoulder 62 of the item of furniture (detail of FIG. 9) and in the final configuration of second movement wherein the expansion bushing, following the action of expansion and of traction exerted by the slider 20, performs the clamping with respect to the walls of the pocket 68 and, consequently, the rigid and stable connection of the shelf 64 with respect to the shoulder 62.

In fact, during the two successive rotations of the cam mechanism 40 the expansion of the opposite externally serrated end rear portions 15 is imposed with consequent locking of the device 10 of the groove or pocket 66 in the shelf 64 and the simultaneous expansion and retraction of the expansion bushing 30, which performs an action of clamping with radial stress with respect to the groove or pocket 68 with simultaneous traction stress between the two components of the item of furniture, defining in this way a stable clamping between the parts without the risk of loosening of the restraint.

In the above mention was made of two successive rotations through 90° of the cam mechanism 40 by means of the tool 50, but it is clear that the movement of the cam mechanism 40 can be single and continuous over an arc of 180°, as shown in the accompanying drawings, or also over a smaller arc.

The optional disassembly of the item of furniture can be implemented by imposing, by means of the tool 50, a rotation in an opposite direction to that of the phase of assembly/clamping, so as to bring the device into the rest configuration. In this case, if required, the device 10 can also be extracted from the groove or pocket 66 of the shelf, where it is no longer restrained for the return into the non-expanded position of the opposite serrated portions 15.

From what has been disclosed the advantages appear clear of the joining device for parts of furniture and furnishing accessories according to the invention, which does not need auxiliary components to perform the clamping, and which with a one-direction movement of the slider 20 produces the expansion of the rear serrated parts 15 and the simultaneous expansion and backward movement of the expansion bushing 30.

Naturally the invention is not limited to the particular embodiment previously described and illustrated in the accompanying drawings, but numerous detailed changes may be made thereto, within the reach of the person skilled in the art, without thereby departing from the scope of the invention itself as defined by the appended claims.

What is claimed is:

1. A joining device for parts of furniture and furnishing accessories, shelf units, bookcases, drawer units, bed frames, or seating types, the joining device comprising:
   a casing suitable for being inserted in a seat formed in a first of two components of an item of furniture to be joined;
   an expansion bushing externally projecting with respect to a first end of said casing and suitable for engaging with a further seat of a second component of the item of furniture to be joined to the first component wherein the casing is inserted; and
   a cam mechanism for a linear motion of an actuation means co-operating in an expansion and retraction deformation movement of the expansion bushing and simultaneous expansion of at least one portion of said casing with said cam mechanism and actuation means housed in the casing and configured to be actuated by a tool;
   wherein said actuation means comprise a slider, driven in translation by said cam mechanism, to which slider said expansion bushing is made integral, co-operating with a wedge-shaped protuberance of the casing for its simultaneous expansion and retraction movement, said slider having a wedge-shaped rear part for expansion of said at least one portion of said casing follows its linear movement; and
   wherein said expansion bushing has a substantially cylindrical shank in which a slot is formed, apt to be engaged by a protuberance of the slider, a pair of lateral wings being projected at the front from said shank, distanced so as to define an empty space apt to receive said protuberance of the casing, respective thickened portions with outer teeth being provided frontally to the wings.

2. The joining device according to claim 1, wherein the cam mechanism comprises a central section with cam profile, apt to house in a seat of the slider and to come into contact with axially opposed shoulders of the slider.

3. The joining device according to claim 2, wherein said cam mechanism comprises a seat, through and shaped to allow the introduction of the tool apt to actuate the rotation of said cam mechanism.

4. The joining device according to claim 1, wherein respective flexible tabs are provided on said wings of the expandable bushing.

5. The joining device according to claim 2, wherein the casing comprises a first half-shell and a second half-shell, each having a respective through opening, formed in a perpendicular direction to the longitudinal axis of said half-shells and coaxial with a slot of the slider provided in said seat, said holes being suitable for housing, respectively, an upper section and a lower section of the cam mechanism and for supporting the rotation of said cam mechanism.

6. The joining device according to claim 5, wherein said second half-shell has side walls with a circular shaped profile with a window for the housing of opposite lateral protuberances provided at the sides of said slot of the slider.

7. A method of joining of parts of modular furniture or furnishing accessories by means of the joining device according to claim 1, wherein the method comprises the steps of:
   inserting the joining device in a groove or pocket formed in the thickness of one of the components to be joined, with the front portion of the bushing projecting externally to said groove or pocket and inserted in a further pocket formed in the thickness of the other component to be joined;
   rotationally actuating the cam mechanism to exert a thrust action on the slider to impose an expansion and retraction of the bushing to exert an action of radial pressure and of traction on the lateral surface of said groove or pocket and simultaneous expansion of said at least one portion of the casing.

8. A joining device for parts of furniture and furnishing accessories, shelf units, bookcases, drawer units, bed frames, or seating types, the joining device comprising:
   a container body suitable for being inserted in a seat formed in a first of two components of an item of furniture to be joined;

an expansion bushing externally projecting with respect to a front end of said container body and suitable for engaging with a further seat of a second component of the item of furniture to be joined to the first component wherein the container body is inserted; and a cam mechanism for a linear motion of an actuation means co-operating in an expansion and retraction deformation movement of the expansion bushing and simultaneous expansion of at least one portion of said container body, with said cam mechanism and actuation means housed in the container body and configured to be actuated by a tool;

wherein said actuation means comprise a slider, driven in translation by said cam mechanism, to which slider said expansion bushing is made integral, co-operating with a wedge-shaped protuberance of the container body for its simultaneous expansion and retraction movement, said slider having a wedge-shaped rear part for expansion of said at least one portion of said container body following its linear movement;

wherein the cam mechanism comprises a central section with cam profile, apt to house in a seat of the slider and to come into contact with axially opposed shoulders of the slider;

wherein the container body comprises a first half-shell and a second half-shell, each having a respective through hole, formed in a perpendicular direction to the longitudinal axis of said half-shells and coaxial with a slot of the slider provided in said seat, said holes being suitable for housing, respectively, an upper section and a lower section of the cam mechanism and for supporting the rotation of said cam mechanism; and wherein said second half-shell has side walls with a circular profile with a window for the housing of opposite lateral protuberances provided at the sides of said slot of the slider.

\* \* \* \* \*

UNITED STATES PATENT AND TRADEMARK OFFICE
CERTIFICATE OF CORRECTION

PATENT NO. : 11,268,556 B2
APPLICATION NO. : 16/214047
DATED : March 8, 2022
INVENTOR(S) : Antonio Giovannetti It is certified that error appears in the above-identified patent and that said Letters Patent is hereby corrected as shown below:

In the Claims

Column 8, Claim 1, Line 12, "follows" should read --following--.

Signed and Sealed this
Seventh Day of June, 2022

Katherine Kelly Vidal
Director of the United States Patent and Trademark Office